May 3, 1960     E. A. BROWN     2,935,708

MAGNETIC CORE ASSEMBLY

Filed March 9, 1956

*INVENTOR.*
EDGAR A. BROWN

United States Patent Office

2,935,708
Patented May 3, 1960

2,935,708

MAGNETIC CORE ASSEMBLY

Edgar A. Brown, Los Angeles, Calif., assignor to International Business Machines Corporation, New York, N.Y., a corporation of New York Application March 9, 1956, Serial No. 570,507

2 Claims. (Cl. 336—192)

This invention relates to a magnetic core assembly, and particularly to such an assembly formed from laminate sheets.

Laminated magnetic cores are known in which the cores are stamped or etched from generally thin sheet metal. In such fabrication the core portion is completely divorced from the rest of the laminate material, the separate core laminations being stacked in any number of different ways. However, such an arrangement does not provide ease in handling and assembling the core laminations. Furthermore, the complete separation of the core portion from the rest of the laminate material requires the location of anchoring means for the ends of the core windings on the core portion itself.

Therefore, the principal object of this invention is to provide a laminated magnetic core that may be assembled easily and efficiently.

Another object is to provide a laminated magnetic core that lends itself to machine winding.

Another object is to provide a laminate magnetic core assembly in which each core portion is partially connected to the main body of the laminate material.

Still another object is to provide a laminated magnetic core arrangement in which the main body of the laminate material, and not the core portion itself, contains the anchoring means for the core winding ends.

Other objects of the invention will be pointed out in the following description and claims and illustrated in the accompanying drawings, which disclose, by way of examples, the principle of the invention and the best mode, which has been contemplated, of applying that principle.

Generally, the invention consists of a plurality of stacked laminate sheets each of which has one or more core portions partially divorced, for example, by etching, from the main body of the laminate material. This arrangement provides a core that is substantially isolated magnetically from the main body of the laminate material, and, therefore, the magnetic performance of such a core is not noticeably different from the performance obtained from laminated cores that are completely divorced from the laminate material from which they are formed. The location of etched-out lugs on the main body of the laminate material and not on the main core portion permits any number of such lugs to be located thereon without in any manner interfering with the assembly of the cores.

Figure 1:
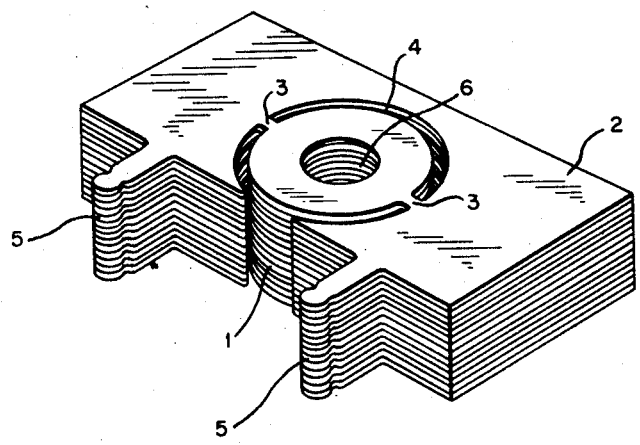
Fig. 1 illustrates one embodiment of a magnetic core assembly, according to the invention.

More specifically, Fig. 1 illustrates a laminated core assembly, in which the laminate sheets each have a core portion 1, with a central air gap 6, partially divorced from the main body of the laminate material 2 and stacked together to form a complete assembly. Two neck portions 3 provide a mechanical connection between each core portion and the main body of the laminate sheet. A suitable air gap 4 separates each core portion 1 from the laminate material 2. The two lugs 5 provide an anchoring or electrical connecting point for core windings (not shown) and for any electrical components.

Figure 2:
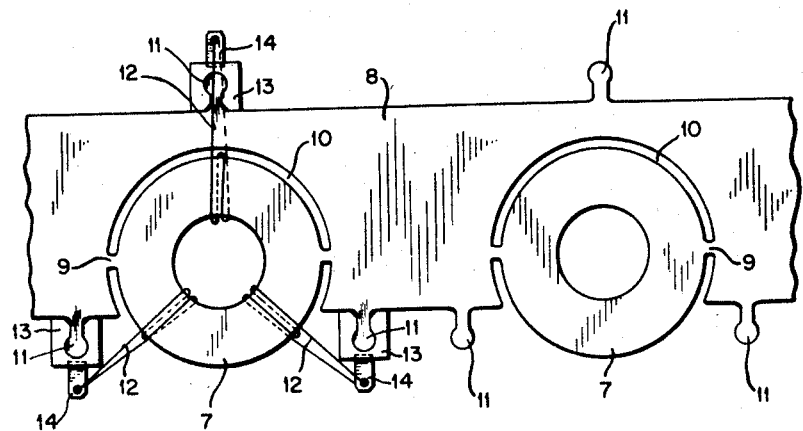
Fig. 2 illustrates another embodiment of a magnetic core assembly, according to the invention.

Fig. 2 illustrates another embodiment of this invention in which more than one core portion is formed from each laminate strip and assembled. Each of the core portions 7 is mechanically connected to the main body 8 of the laminate material by two necks 9. Air gaps 10 separate core portions 7 from the laminate material 8. Each of the cores is shown extended beyond the edge of the main body of the laminate material 8.

Like the core portions 7, the plurality of anchoring lugs 11 are etched out from the laminate material 8 at the time that each core portion is formed. Insulated strips 13, each having a plurality of contact lugs 14 (see Fig. 3) imbedded therein, are shown mounted on three of the laminated anchor lugs 11. The coil windings 12 are shown with one of their ends secured to a top contact lug 14 and the other end secured to a bottom contact lug (not shown).

Figure 3:
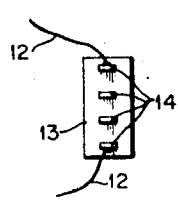
Fig. 3 illustrates one type of insulated strip, having four lugs, for mounting on a laminated anchor lug.

Fig. 3 illustrates another view of the lug mounting arrangement shown in Fig. 2. One end of the coil winding 12 is shown connected to the top contact lug 14, and the other end of the same coil winding is connected to the bottom contact lug 14. Four contact lugs are shown imbedded in insulated strip 14, although it must be understood that a greater or lesser number of contact lugs 13 may be so imbedded. Since only two lugs 14 may be used for the purpose of securing coil winding ends, as shown in Fig. 3, the extra lugs may serve to provide electrical contact connections for other circuit components.

Of course, it must be understood that the core portion may be made to extend a greater or lesser distance from the edges of the main body of the lamination. In the same way, any number and character of anchoring means may be formed during fabrication to fulfill a particular circuit design. For example, a greater number of lugs may be etched out for the purpose of providing anchoring terminals for electric circuit components other than those directly associated with the core windings. The air gap between the core and the remainder of the laminate material may also be varied. The core itself may have more than one internal air gap and the windings which go through these air spaces in a selected manner may be connected to selected ones of the anchoring lugs.

While there have been shown and described and pointed out the fundamental novel features of the invention as applied to a preferred embodiment, it will be understood that various omissions and substitutions and changes in the form and details of the device illustrated and in its operation my be made by those skilled in the art, without departing from the spirit of the invention. It is the intention, therefore, to be limited only as indicated by the scope of the following claims.

What is claimed is:

1. A plural magnetic core assembly comprising a stack of metal laminations each including integral elements; an unusable main body, a plurality of cores each of which is attached to said main body by two thin sections of the lamination, and extensions from said main body for anchoring core winding ends to be used with said cores, and means electrically isolated from said body and mounted on each of said extensions for anchoring the core winding ends.

2. A magnetic core assembly comprising a plurality of metal laminations each including integral elements; an unusable main body, a plurality of cores attached to said main body by thin sections of the laminations, and extensions from said main body for anchoring core winding ends; with said cores being spaced from each other a distance sufficient to allow for said extensions, and means including a conductive portion and a non-conductive portion mounted on each of said extensions for anchoring core winding ends.

References Cited in the file of this patent

UNITED STATES PATENTS

| | | |
|---|---|---|
| 1,425,091 | Horelick | Aug. 8, 1922 |
| 1,654,306 | Paszkowski | Dec. 27, 1927 |
| 1,910,172 | Kouyoumjian | May 23, 1933 |
| 2,160,007 | Turner | May 30, 1939 |
| 2,536,795 | Carson | Jan. 2, 1951 |
| 2,553,554 | Dierstein | May 22, 1951 |
| 2,578,395 | Brooks | Dec. 11, 1951 |
| 2,616,070 | Corbino | Oct. 28, 1952 |